(No Model.)  M. G. HUBBARD.  4 Sheets—Sheet 2.
CAR TRUCK.

No. 487,273.  Patented Dec. 6, 1892.

Attest:
Geo. T. Smallwood
Jas. K. McCathran

Inventor:
Moses G. Hubbard,
By A. M. Smith & Son,
Attorneys.

THE NORRIS PETERS CO., PHOTO-LITHO., WASHINGTON, D. C.

(No Model.) 4 Sheets—Sheet 3.

M. G. HUBBARD.
CAR TRUCK.

No. 487,273. Patented Dec. 6, 1892.

Attest:
Geo. T. Smallwood
Jas. K. McCathran

Inventor:
Moses G. Hubbard,
By A. M. Smith & Son,
Attorneys.

(No Model.)

M. G. HUBBARD.
CAR TRUCK.

No. 487,273.

Patented Dec. 6, 1892.

4 Sheets—Sheet 4.

Attest:
Geo. T. Smallwood
Jas. K. McCathran

Inventor:
Moses G. Hubbard,
By A. M. Smith & Son,
Attorneys.

UNITED STATES PATENT OFFICE.

MOSES G. HUBBARD, OF PHILADELPHIA, PENNSYLVANIA.

CAR-TRUCK.

SPECIFICATION forming part of Letters Patent No. 487,273, dated December 6, 1892.

Application filed May 11, 1889. Serial No. 310,442. (No model.)

*To all whom it may concern:*

Be it known that I, MOSES G. HUBBARD, of Philadelphia, county of Philadelphia, and State of Pennsylvania, have invented a new and useful Improvement in Car-Trucks, of which the following is a full, clear, and exact description, reference being had to the accompanying drawings, making part of this specification.
My invention consists in an improved car-truck for steam motor, electric, and cable cars; and it relates, first, to the construction and attachment of the truck to the car, and it further relates to the manner of arranging and mounting the carrying-bars and the grip and truck-frame for cable-trucks.

Figure 1:
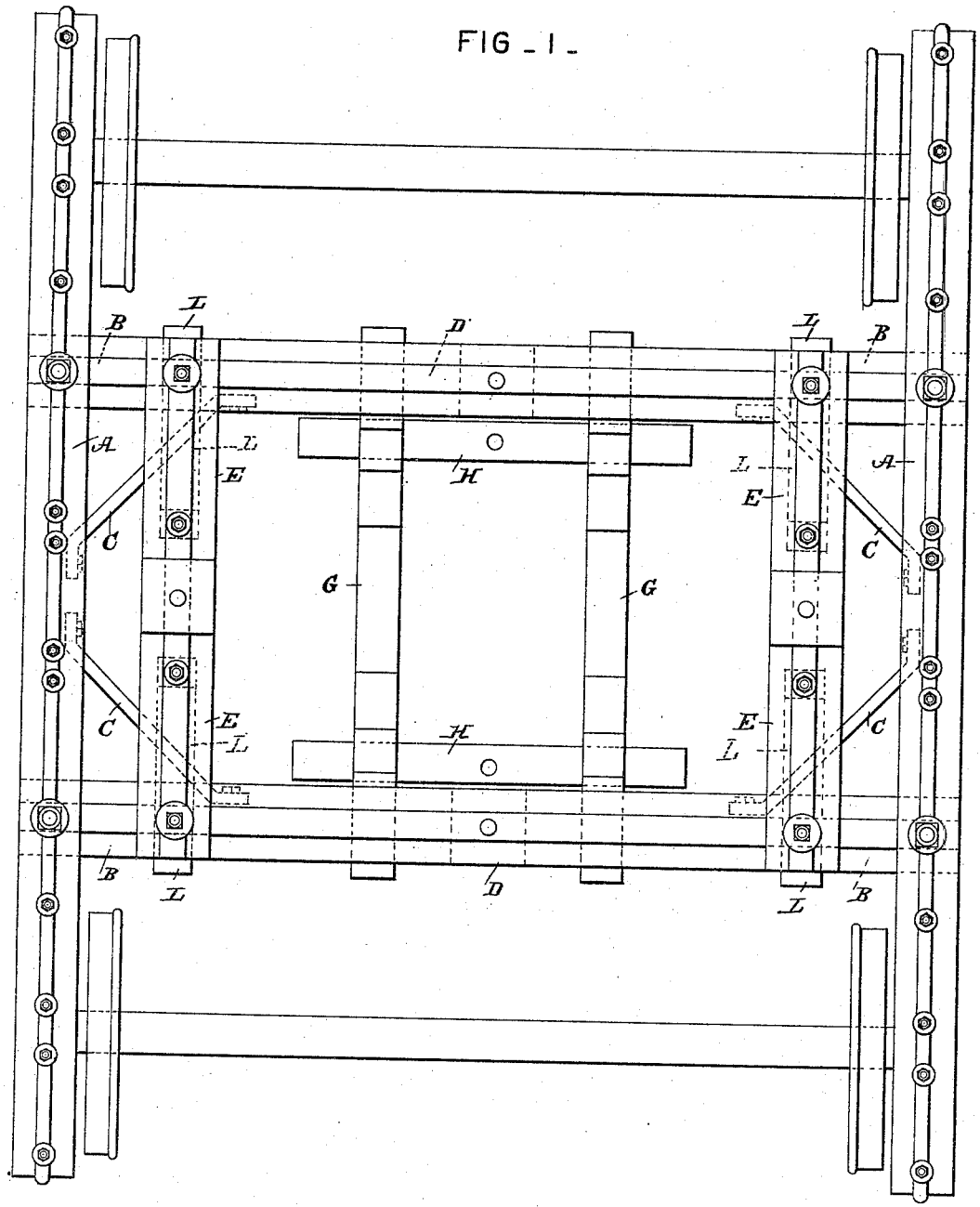
Figure 2:
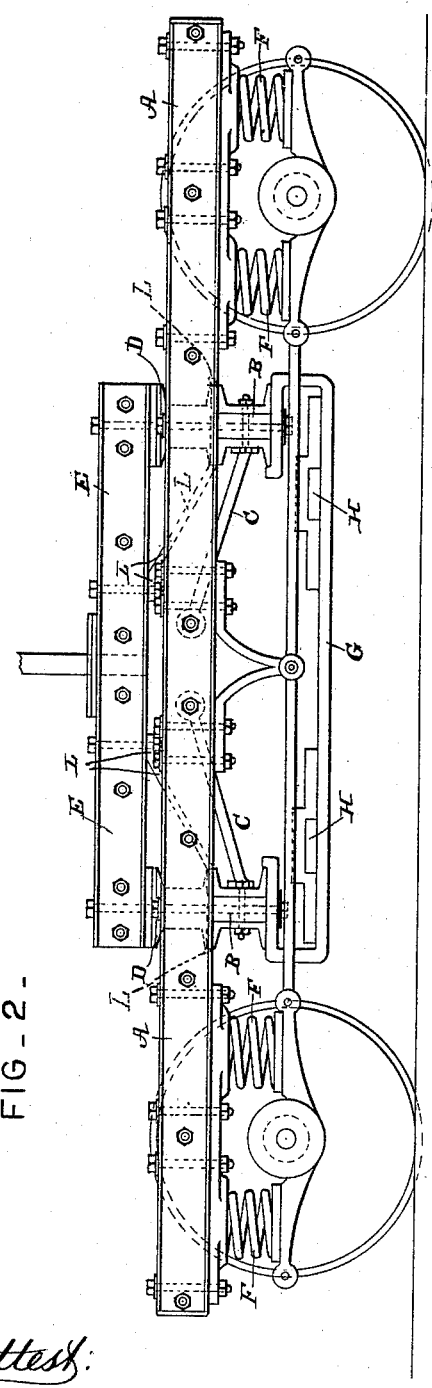
Figure 3:
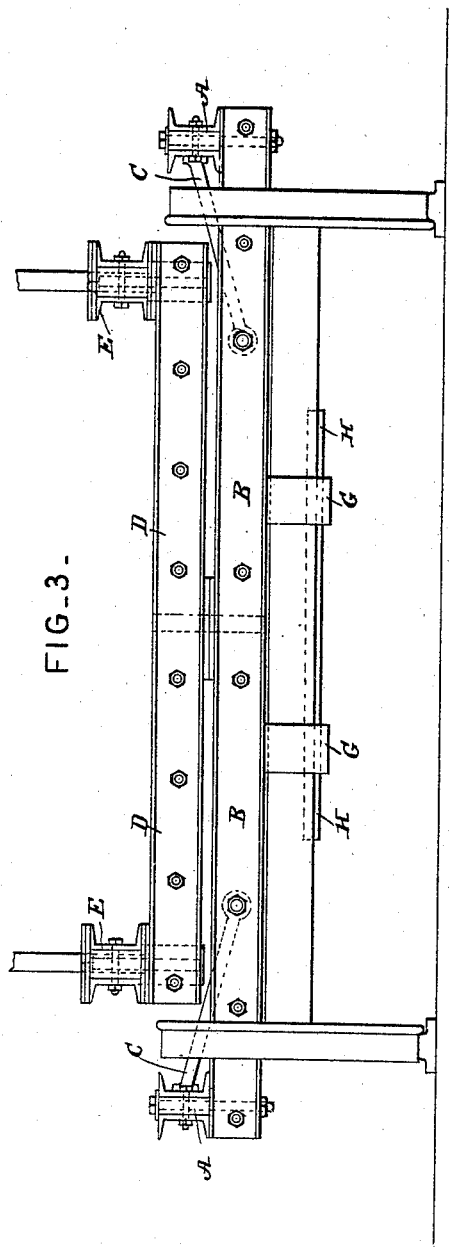
Figure 4:
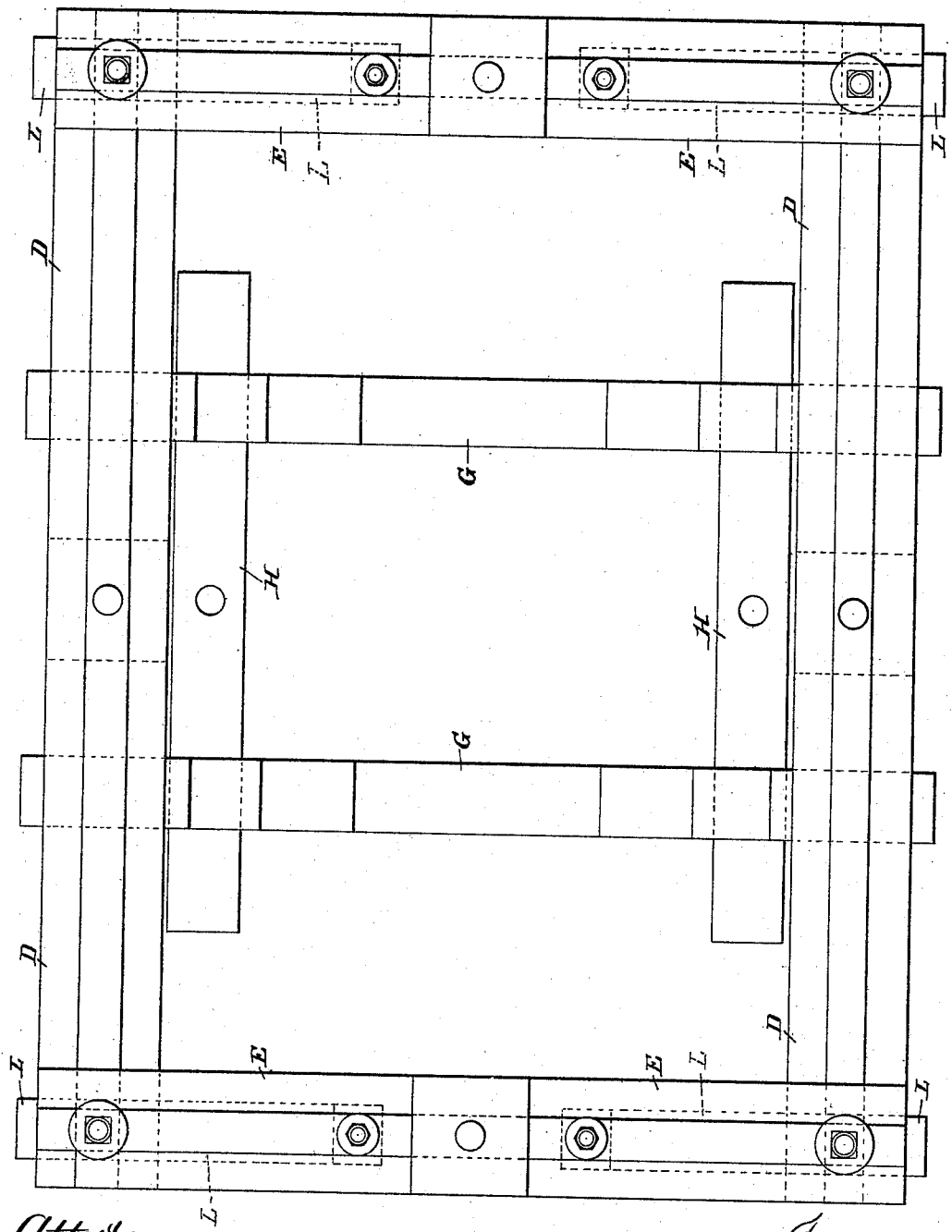
Figure 5:
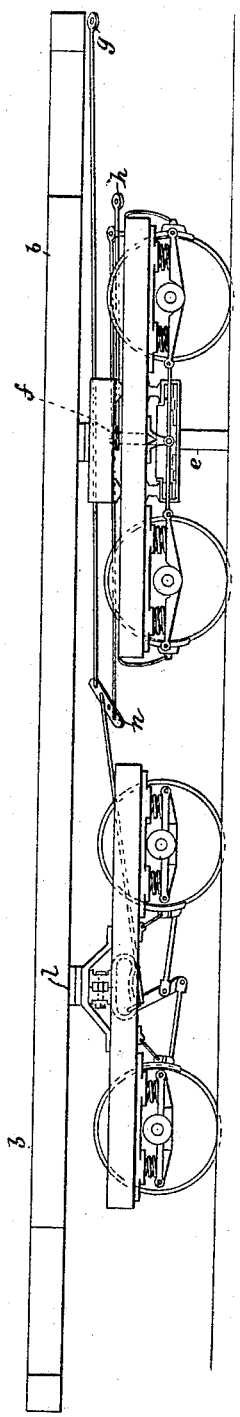
Figure 6:
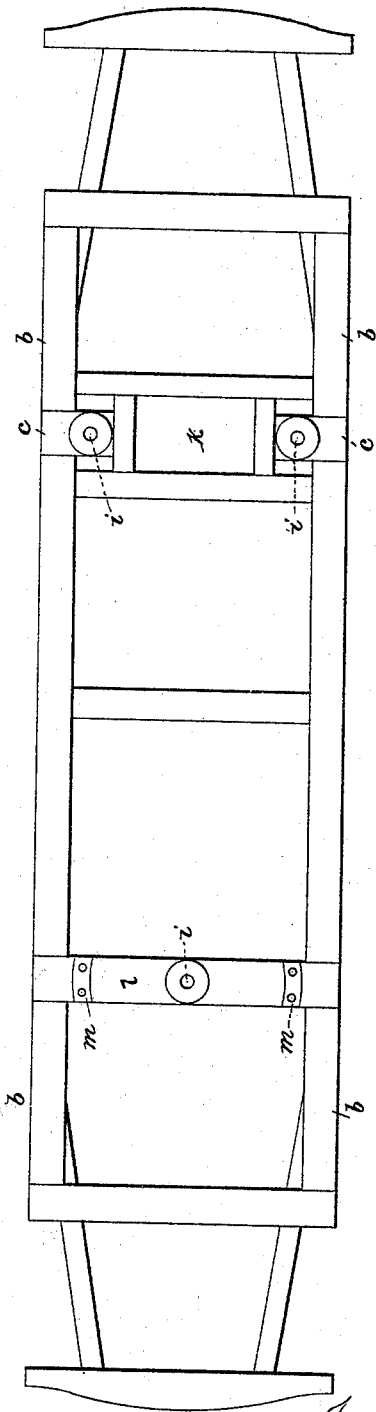

In the accompanying drawings, which form a part of this specification, Figure 1 is a top or plan view. Fig. 2 is a side view. Fig. 3 is an end elevation. Fig. 4 is a detached view of my parallel-motion truck attachment. Fig. 5 is a side view of a portion of a car-bed mounted on a parallel-motion attachment truck at its front end and on my light skeleton truck at rear end; and Fig. 6 is a bottom view of a car-body, showing its under framework and the opening through its bottom for locating a steam or other motor, or for introducing and removing the ordinary grip of a grip or cable truck.

In these trucks it is necessary to have a large space clear of obstructions directly through the center of the truck corresponding with a similar opening in the bottom or flooring of the car to permit the location of the motor or the convenient attachment and removal of the grip, and at the same time the truck must be pivoted to the car-body in such manner that it will freely turn or pivot on its center. It is also necessary to leave room between the truck-frame and the car-body for the brake-rod and for the reach-rod, which connects the grip to the operating-lever when a grip and cable are employed, which cannot be done conveniently if the truck has a bolster. To accomplish these results in the most perfect manner, I construct the truck without any bolster and connect it to the car-body by a parallel-motion attachment, as shown in Fig. 4, and I construct the truck-frame and mount this parallel-motion attachment on it, as shown in Figs. 1, 2, and 3.

The truck-frame is composed of two double-plated wheel-pieces A A and two double-plated cross-sills B B, firmly attached to the said wheel-pieces and braced, as shown at C C C C, Figs. 1, 2, and 3. These cross-sills B B are located on the wheel-pieces at a sufficient distance apart to give the open space required longitudinally of the truck.

That which I have herein called a "parallel-motion attachment" consists of a series of bars pivotally connected to each other and arranged in pairs, the alternate bars being pivoted to the car-body and to the truck, respectively, and the individuals of each pair having their pivotal connections to the adjacent individuals of the series in parallel lines. In the specific construction illustrated I employ two pairs of bars, one pair being normally longitudinal and the other pair D D being transverse to the car. The cross-bars D D can be of any desired length that will swing between the wheel-pieces A A; but as they locate the side bearings of the car on the truck I prefer to make them as long as practicable, in order to support the car as near the side sills as possible, because the aforesaid opening in the car-bottom destroys the body-bolster. Each of the bars D is pivoted at one end to one of the bars E and at the other end to the other bar E, thus forming a pivoted parallelogram or parallel-motion attachment, which is shown in Fig. 4. The longitudinal bars E E are of sufficient length to permit the transverse bars D D to be pivoted to them, as described, at substantially the same distance apart as the cross-sills B B, in order that said transverse bars D D may be themselves pivoted at their middle points, respectively, to the said cross-sills B B. To attach the truck to the car-body by means of this parallel-motion attachment, the center of each of the cross-sills D D is pivoted to the center of the truck cross-sills B B, and the center of each of the longitudinal sills E E is pivoted to the framework of the car-body on a line at right angles to the side sills of the car, as shown in Figs. 1, 2, and 3.

For increase of strength and security of the pivotal connections of the bars E and D to each other the braces L L L L are provided, which are each secured at one end to one of the bars E, as far from the pivotal corner of the parallelogram as can be done without encroaching upon the space needed at the middle point of the length of said bars for pivoting them to the car-body, and extend thence obliquely downward toward the vertical line of the corner-pivots and reach under the transverse bar D at the corner, and are secured pivotally thereto in the line of the pivotal connection of the bars D and E, so that the pivot at that connection is braced. The structure is equivalent to forking the bars E vertically to admit the bars D between their forked arms in order to pivot them there to said bars E. This is merely a device for strength and is not radical nor essential to the invention.

The described arrangement of the bars D and E in the pivoted parallelogram, or, as more generically stated above, with the bars pivoted together in series, leaves the open space in the truck required and over it for the reach-rod and brake-rods, and it pivots the truck to the car by two king-bolts or center plates as perfectly as if attached by one king-bolt or center plate in the ordinary manner of pivoting the truck to a car, and it is proportionally stronger and more durable. For cable-trucks I prefer to mount this entire frame on the limited springs F F F F under each wheel-piece and resting upon the journal-boxes, and then attach the grip to the truck-frame by the carrying-bars G G, which are firmly secured to the cross-sills B B and carry the slide-bars H H, to which the grip is attached in the ordinary manner. If the grip is carried on springs, it will last much longer than if subjected to the vibration and jar of the wheels, and by this construction much jar and vibration of the cable are avoided; but when desired the carrying-bars G G may be journaled to the axles in the ordinary manner of attaching them to four-wheeled cars.

In Fig. 5, $b$ is the car-frame. $f$ is the joint by which the grip reach-rod $h$ is pivoted to the ordinary grip $e$.

In Fig. 6, $b$ is the car-frame; $c\ c$, the front body-bolster, shown divided by the opening K through the car-bottom. $l$ is the rear body-bolster. $i\ i\ i$ are holes for the king-bolts, by which the trucks are pivoted to the car-body. $m\ m$ are the ordinary outer bolster-bearings on rear truck.

For cable roads having ordinary tracks I mount the car on one of these grip-trucks located near its front end and one truck located at its rear end constructed upon the plan of my skeleton truck more fully described in Patent No. 450,726 as shown in Fig. 5; but for cable roads having long steep grades, as in San Francisco and St. Paul, the cars may be mounted on two of the grip-trucks above described for greater safety and durability. When thus mounted on two grip-trucks having a grip in each, the grip connection and the grip-levers should be so arranged that either grip may be worked independently of the other or auxiliary to the other, which would safely avoid such accidents as have occurred from the failure of a grip, or it would double the grip-power when desired in ascending steep grades and proportionally increase the durability of the grip and cable.

For steam motor-cars this form of truck permits the location of a vertical boiler and engine directly on the truck and its connection directly to the axles, while the boiler, &c., projects up through the floor of the car into a small room partitioned off in the car for that purpose.

Having now described my invention, I claim as new—

1. In combination with the car-body and the truck, a series of bars pivotally connected together successively and pivoted alternately to the car-body and to the truck, substantially as and for the purpose set forth.

2. In combination with the car-body and the truck, a series of bars pivotally connected together successively and pivoted alternately to the car-body and to the truck and arranged in pairs whose individuals are parallel and on opposite sides of the vertical axis of the truck, substantially as set forth.

3. In combination with the car-body and the truck, a series of bars pivotally connected together successively and pivoted alternately to the car-body and to the truck, the longitudinal bars of such series being pivoted to the transverse bars above the latter, whereby space is left between the bottom of the car and the transverse bars for reach and brake rods, substantially as set forth.

4. In combination with the car-body and truck, a series of bars pivotally connected together successively and pivoted alternately to the car-body and to the truck, the car-body having an opening through the floor surrounding the vertical axis of the truck and said bars being arranged outside of such opening, substantially as set forth.

5. The wheel-pieces and the cross-sills secured permanently thereto, in combination with the parallel-motion attachment pivoted to the cross-sills and to the car, substantially as and for the purposes described.

6. The combination of the truck-frame and the parallel-motion attachment with a cable-car body having an opening in its floor for introducing or removing the grip, substantially as set forth.

In testimony whereof I have hereunto set my hand this 29th day of January, A. D. 1889.

MOSES G. HUBBARD.

Witnesses:
WALTER B. MCBRIDE,
RICHARD LONG.